(No Model.)
C. N. ORPEN.
AQUARIUM.
No. 256,240. Patented Apr. 11, 1882.
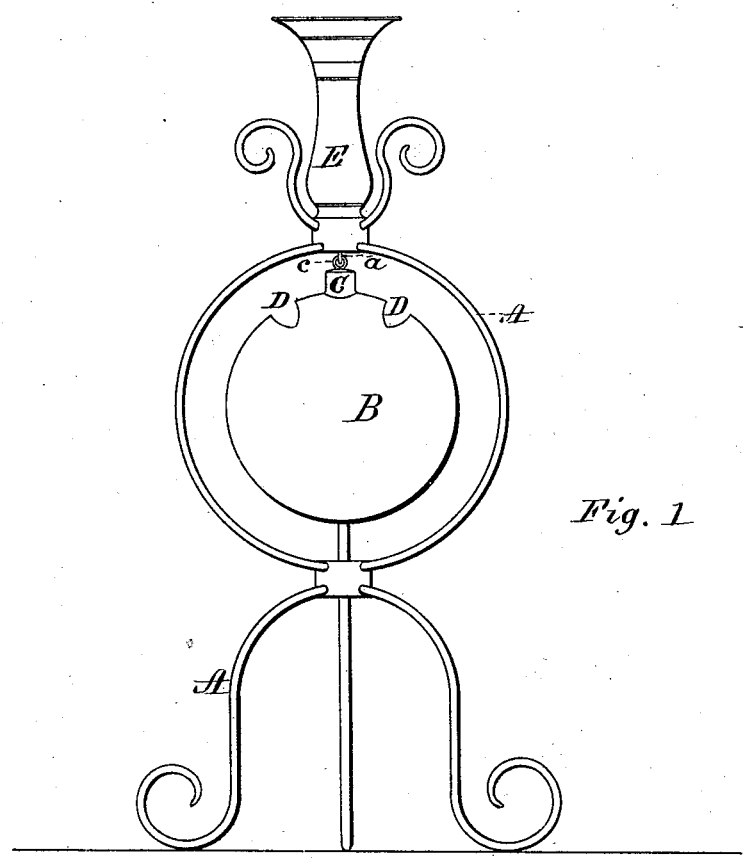
Fig. 1
Fig. 3. Fig. 2. Fig. 4.
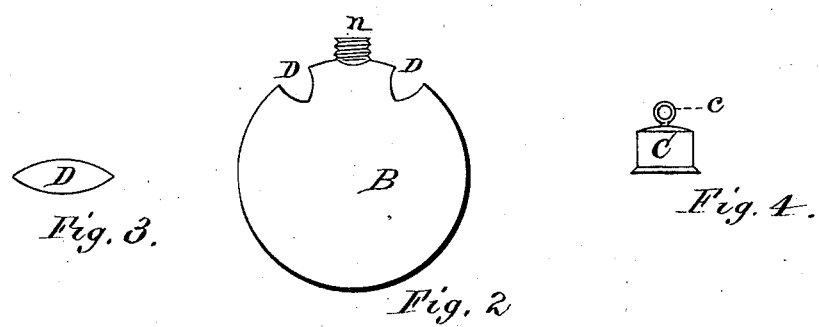
WITNESSES:
William V. H. Hicks
Robert D. Turner
INVENTOR
Charles N. Orpen
BY A. Sidney Doane
ATTORNEY

UNITED STATES PATENT OFFICE.

CHARLES N. ORPEN, OF NEW YORK, N. Y., ASSIGNOR TO THE E. P. GLEASON MANUFACTURING COMPANY, OF SAME PLACE.

AQUARIUM.

SPECIFICATION forming part of Letters Patent No. 256,240, dated April 11, 1882.

Application filed December 19, 1881. (No model.)

*To all whom it may concern:*

Be it known that I, CHARLES N. ORPEN, of the city, county, and State of New York, have invented Improvements in Aquariums; and I do hereby declare that the following is a full, clear, and correct description of the same, reference being had to the accompanying drawings, and to the letters of reference marked thereon, in which—

Figure 1 is a view of my globe and stand. Fig. 2 is a view of the globe; Fig. 3, a view of the slot or opening in the globe; Fig. 4, a view of the thimble used in connection with the globe.

In the drawings, like parts of the invention are pointed out by the same letters of reference.

The nature of the present invention consists in the construction, as more fully hereinafter set forth, of a globe for holding fish or water-plants, and in a stand for supporting the same, the object of the invention being the production of a new, attractive, and instructive article of this class for house ornamentation.

To enable those skilled in the arts to make and use my invention, I will describe the same.

A shows a frame-work of the tripod order, formed of any suitable material, and provided in its upper part with a hook, $a$, from which may be suspended the globe B.

B is a globe, formed of glass, and intended to be used as a receptacle for fish or water-plants. The globe B is usually made with a projecting threaded nipple, $n$, to which the thimble C is screwed or otherwise held in any convenient way. In the upper part of thimble C is an eye, $c$, by which the globe B may be suspended from the hook $a$ in the stand A, and upon each side of this thimble C the upper portion of the globe B is provided with the oval openings D, so that a current of air is maintained upon the surface of the water contained in the globe B, and at the same time provision is made for access to the interior of the globe B through these openings to fill the same with water and for the introduction of the fish or water-plants. The upper portion of the stand A may, if desired, be provided with a vase or receptacle, E, for flowers, although in many cases this vase may not be employed.

Such being the construction, the globe B is partially filled with water and the fish or water-plants placed in the same through the oval openings D, and a current of air being maintained upon the surface of the water through these openings, the water in the globe B will be kept cool and pure and require to be changed only occasionally.

The article thus produced will form an attractive and instructive one for house ornamentation.

Having now described my invention, what I claim as new is—

1. In an aquarium, a globe, B, provided with a threaded nipple, and with small openings D, in combination with a thimble, C, substantially as set forth.

2. In an aquarium, the combination, with a stand, A, provided with a hook, $a$, of the globe B, having the thimble C and eye $c$ and the oval openings D, substantially as and for the purposes set forth.

CHAS. N. ORPEN.

Witnesses:
E. P. GLEASON,
E. F. GENNERT.